United States Patent [19]

Parker

[11] Patent Number: 4,612,350

[45] Date of Patent: Sep. 16, 1986

[54] BIS(HYDROXYPHENYL)FLUORENE POLYARYLATE POLYMERS AND ALLOYS

[75] Inventor: Phillip H. Parker, San Rafael, Calif.

[73] Assignee: Chevron Research Company, San Francisco, Calif.

[21] Appl. No.: 752,341

[22] Filed: Jul. 3, 1985

Related U.S. Application Data

[63] Continuation of Ser. No. 687,061, Dec. 28, 1984, abandoned.

[51] Int. Cl.⁴ .............................................. C08G 63/18
[52] U.S. Cl. .................................. 525/177; 525/439; 528/125; 528/126; 528/128; 528/190; 528/193; 528/194; 528/271
[58] Field of Search ................ 525/177, 439; 528/125, 528/126, 128, 190, 193, 194, 271

[56] References Cited

U.S. PATENT DOCUMENTS 4,387,209 6/1983 Rieder et al. ...................... 528/190
4,430,493 2/1984 Rieder ................................. 528/190

OTHER PUBLICATIONS

A. M. Usmani, ACS Symposium Series No. 260, Polymers and Fibers and Elastomers, No. 20, pp. 325-338 (1984).

A. M. Usmani, I. O. Salyer and R. P. Chartoff, Preprints of the ACS Division of Organic Coatings and Plastics, vol. 43, pp. 87-93 (1980).

J. Lo, S. N. Lee and E. M. Pierce, JAPS, vol. 29, pp. 35-43 (1984).

*Primary Examiner*—Lester L. Lee
*Attorney, Agent, or Firm*—T. G. DeJonghe; C. J. Caroli

[57] ABSTRACT

Polyarylate polymers derived from (A) mixtures of bis(hydroxyphenyl)fluorene compounds with anthracene bisphenols, and (B) a mixture of isophthalic and terephthalic acid. Also disclosed are polyarylate alloy compositions comprising a bis(hydroxyphenyl)fluorene polyarylate and a polymer resin selected from polybisphenol A carbonate and polystyrene.

29 Claims, No Drawings

BIS(HYDROXYPHENYL)FLUORENE POLYARYLATE POLYMERS AND ALLOYS

This is a continuation of application Ser. No. 687,061 filed Dec. 28, 1984 and now abandoned.

BACKGROUND OF THE INVENTION

The present invention relates to polyarylate polymers and alloys. More particularly, this invention relates to bis(hydroxyphenyl)fluorene polyarylate polymers and alloys having superior thermal properties.

Polyarylates are defined as aromatic polyester polymers derived from dihydroxy aromatic compounds (diphenols) and aromatic dicarboxylic acids.

In general, aromatic polyesters prepared from bisphenols or functional derivatives thereof and a terephthalic acid-isophthalic acid mixture or a mixture of the functional derivatives thereof, i.e., bisphenol terephthalate-bisphenol isophthalate polyesters, have excellent mechanical properties, such as tensile strength, bending strength, bending recovery or impact strength, excellent thermal properties, such as deflection temperature under load or degradation temperature, excellent electrical properties, such as resistivity, electric breakdown endurance, arc resistance, dielectric constant or dielectric loss and low flammability, good dimensional stability, and the like.

These aromatic polyesters are thus useful in many fields. Aromatic polyesters find special use as plastics for injection molding, extrusion molding, press molding, and the like, as monofilaments, fibers, films and coatings.

U.S. Pat. No. 3,216,970 describes polyarylates which include polymers of bisphenol A and isophthalic acid or a mixture of isophthalic acid and terephthalic acid. These polyarylates are prepared by converting the phthalic acid component to the diacid chloride which is then reacted with the bisphenol A or its sodium salt.

U.S. Pat. No. 3,884,990 describes a blend of various bisphenol polyarylates and poly(ethylene oxybenzoate), which is useful for producing molded articles having improved cracking and crazing resistance. Similarly, U.S. Pat. No. 3,946,091 describes a blend of bisphenol polyarylates and poly(ethylene terephthalate) which provides molded articles of reduced crazing.

U.S. Pat. No. 3,792,118 describes a styrene resin composition resistant to heat deformation which comprises a blend of polyarylene esters and various styrene resins.

SUMMARY OF THE INVENTION

The present invention provides a polyarylate copolymer derived from (A) a mixture of a bis(hydroxyphenyl)fluorene compound of the formula

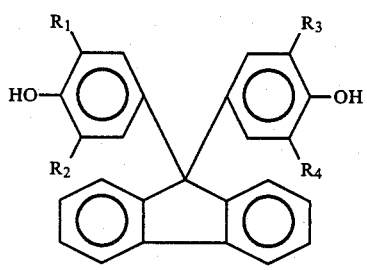

wherein $R_1$, $R_2$, $R_3$ and $R_4$ are independently hydrogen, lower alkyl of 1 to 4 carbon atoms or phenyl; and a bisphenol compound of the formula

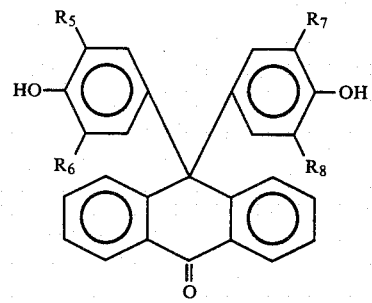

wherein $R_5$, $R_6$, $R_7$ and $R_8$ are independently hydrogen, lower alkyl of 1 to 4 carbon atoms or phenyl; and wherein the molar ratio of bis(hydroxyphenyl)fluorene to bisphenol is from 20:1 to 1:20; and (B) a mixture of isophthalic and terephthalic acid in a molar ratio of 9:1 to 1:9, respectively.

The present invention is further concerned with a polyarylate alloy composition comprising (A) 10 to 90% by weight of a polyarylate of the formula

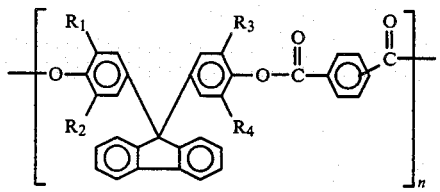

wherein $R_1$, $R_2$, $R_3$ and $R_4$ are independently hydrogen, lower alkyl of 1 to 4 carbon atoms or phenyl; n is the degree of polymerization; and wherein

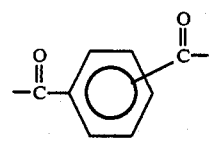

is an isophthalic or terephthalic acid moiety present in a molar ratio of 9:1 to 1:9, respectively; and (B) 10 to 90% by weight of a polymer resin selected from the group consisting of polybisphenol A carbonate and polystyrene.

Also contemplated by the present invention is a polyarylate alloy composition comprising (A) 10 to 90% by weight of a polyarylate copolymer derived from (1) a mixture of a bis(hydroxyphenyl)fluorene compound of the formula

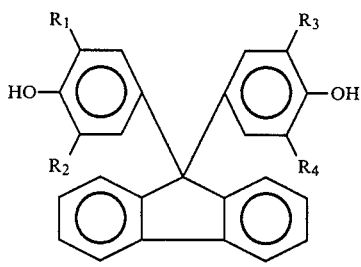

wherein $R_1$, $R_2$, $R_3$ and $R_4$ are independently hydrogen, lower alkyl of 1 to 4 carbon atoms or phenyl; and a bisphenol compound of the formula

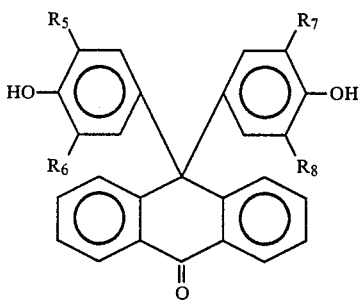

wherein $R_5$, $R_6$, $R_7$ and $R_8$ are independently hydrogen, lower alkyl of 1 to 4 carbon atoms or phenyl; and wherein the molar ratio of bis(hydroxyphenyl)fluorene to bisphenol is from 20:1 to 1:20; and (2) a mixture of isophthalic and terephthalic acid in a molar ratio of 9:1 to 1:9, respectively; and (B) 10 to 90% by weight of a polymer resin selected from the group consisting of polybisphenol A carbonate and polystyrene.

Among other factors, the present invention is based on the discovery that certain polyarylate copolymers, derived from mixtures of bis(hydroxyphenyl)fluorene compounds with other bisphenols, have been found to possess superior thermal properties. In addition, it has been found that the above-described bis(hydroxyphenyl)fluorene polyarylates provide alloy compositions with polystyrene and polybisphenol A carbonate which also exhibit excellent thermal properties.

DETAILED DESCRIPTION OF THE INVENTION

For purposes of the present invention, those polyarylates derived from a single bis(hydroxyphenyl)fluorene compound shall be referred to as "homopolymers" and those polyarylates derived from a mixture of bis(hydroxyphenyl)fluorene and other bisphenol compounds shall be referred to as "copolymers". It is, of course, understood that bis(hydroxyphenyl)fluorene may be characterized as a type of bisphenol compound. Furthermore, the term "alloy" as used herein is meant to define an intimate physical mixture or blend of two or more polymers.

The bis(hydroxyphenyl)fluorene compounds which are useful for conversion into the instant polyarylate homopolymers and copolymers may be represented by the following formula

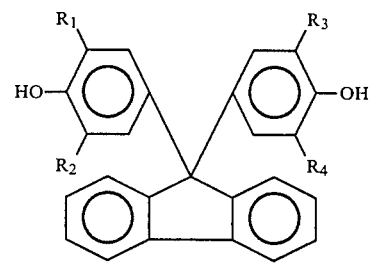

wherein $R_1$, $R_2$, $R_3$ and $R_4$ are independently hydrogen, lower alkyl of 1 to 4 carbon atoms or phenyl. Preferably, the bis(hydroxyphenyl)fluorene will have from 2 to 4 substituents in positions ortho to the hydroxy groups.

Preferred examples of bis(hydroxyphenyl)fluorene compounds include the tetraalkyl derivatives, that is, wherein $R_1$, $R_2$, $R_3$ and $R_4$ are independently lower alkyl of 1 to 4 carbon atoms. A particularly preferred compound is that wherein $R_1$, $R_2$, $R_3$ and $R_4$ are methyl, that is, 9,9-bis(3',5'-dimethyl-4'-hydroxyphenyl)fluorene or, conveniently, tetramethyl bis(hydroxyphenyl)fluorene.

The bis(hydroxyphenyl)fluorene compounds used to form the polyarylates of the invention are prepared by reacting an appropriately substituted phenol with 9,9-dichlorofluorene in the presence of a Friedel-Crafts catalyst. A typical ortho-substituted phenol is 2,6-dimethylphenol. Suitable Friedel-Crafts catalysts include aluminum chloride, ferric chloride, stannic chloride, boron trifluoride, hydrogen fluoride, hydrogen chloride, sulfuric acid, phosphoric acid, and the like.

The instant polyarylate homopolymers and copolymers are prepared from the above bis(hydroxyphenyl)fluorenes or from mixtures of these compounds and other bisphenols. The instant polyarylate homopolymers are prepared from a single bis(hydroxyphenyl)fluorene compound or a functional derivative thereof. In a similar fashion, the instant polyarylate copolymers are prepared from a mixture of a bis(hydroxyphenyl)fluorene compound or functional derivative thereof and a bisphenol compound of the formula

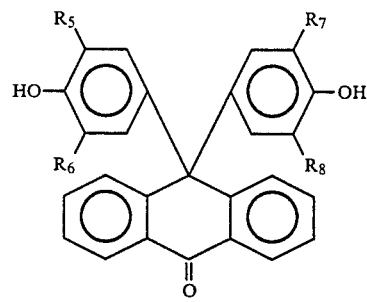

or functional derivative thereof; wherein $R_5$, $R_6$, $R_7$ and $R_8$ are independently hydrogen, lower alkyl of 1 to 4 carbon atoms or phenyl. When $R_5$, $R_6$, $R_7$ and $R_8$ are all hydrogen, the compound obtained, 5-keto-10,10-bis(4'-hydroxyphenyl)anthracene, is conveniently referred to as 5-keto-bis(hydroxyphenyl)anthracene. When $R_5$, $R_6$, $R_7$ and $R_8$ are not all hydrogen, the compound obtained will herein be referred to as a substituted 5-keto-bis(hydroxyphenyl)anthracene.

Preferred examples of 5-keto-bis(hydroxyphenyl)anthracene compounds include the unsubstituted compound and the tetraalkyl derivative. Particularly preferred compounds are those wherein $R_5$, $R_6$, $R_7$ and $R_8$ are hydrogen, i.e., 5-keto-10,10-bis(4'-hydroxyphenyl)anthracene, and wherein $R_5$, $R_6$, $R_7$ and $R_8$ are methyl, i.e., 5-keto-10,10-bis(3', 5'-dimethyl-4'-hydroxyphenyl)anthracene.

The 5-keto-bis(hydroxyphenyl)anthracene compounds used in the invention are prepared by reacting an unsubstituted or ortho-substituted phenol with anthraquinone in the presence of a Friedel-Crafts catalyst. A typical substituted phenol is 2,6-dimethylphenol. Suitable Friedel-Crafts catalysts include tin tetrachloride, aluminum trichloride, and the like.

Typical functional derivatives of the above-described bis(hydroxyphenyl)fluorenes and anthracene bisphenols include the metal salts and the diesters with monocarboxylic acids having 1 to 3 carbon atoms. Preferred functional derivatives are the sodium salts, potassium salts and diacetate esters.

For the polyarylate copolymers of the present invention, the mixture of bis(hydroxyphenyl)fluorene and bisphenol will have a molar ratio of bis(hydroxyphenyl)fluorene to bisphenol of about 20:1 to 1:20. Preferably, the molar ratio of bis(hydroxyphenyl)fluorene to bisphenol will be about 9:1 to 1:9, more preferably, about 4:1 to 1:4.

The acid component which is reacted with the bis(hydroxyphenyl)fluorene or bis(hydroxyphenyl)fluorenebisphenol mixture to prepare the polyarylates of the invention is a mixture of isophthalic and terephthalic acid or functional derivatives thereof in a molar ratio of about 9:1 to 1:9, respectively. Preferably, the molar ratio of isophthalic to terephthalic acid will be about 3:1 to 1:3, more preferably, about 1:1.

Preferred functional derivatives of isophthalic or terephthalic acid include acid halides, such as isophthaloyl or terephthaloyl dichloride and isophthaloyl or terephthaloyl dibromide, and diesters, such as dialkyl esters or diaryl esters, having from 1 to 6 carbon atoms per ester group. Examples of suitable diesters include diphenyl isophthalate and diphenyl terephthalate.

The polyarylate homopolymers used in the present invention can be generally represented by the formula

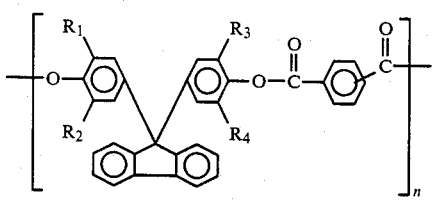

wherein $R_1$, $R_2$, $R_3$ and $R_4$ are independently hydrogen, lower alkyl of 1 to 4 carbon atoms or phenyl; and n is the degree of polymerization. Generally, n will be adjusted to provide a polymer having an average molecular weight greater than about 15,000.

In the case of the polyarylate copolymers derived from a bis(hydroxyphenyl)fluorene-bisphenol mixture, the bis(hydroxyphenyl)fluorene and bisphenol moieties will normally occur in random order throughout the polyarylate.

The polyarylates of this invention can be prepared by several methods. For example, an interfacial polycondensation process can be used. In this case an aqueous alkaline solution of a bisphenol or mixture of bisphenols and a terephthaloyl dihalide-isophthaloyl dihalide mixture dissolved in an organic solvent which is immiscible with water are mixed and reacted. Suitable interfacial polycondensation processes which can be used are disclosed, for example, in W. M. Eareckson, *J. Polymer Sci.*, XL 399 (1959) and Japanese Patent Publication No. 1959/65.

The following is a typical polycondensation process. An aqueous alkali solution of a bisphenol or mixture of bisphenols is added to a terephthaloyl dihalide-isophthaloyl dihalide mixture, more preferably, a terephthaloyl dichloride-isophthaloyl dichloride mixture, dissolved in an organic solvent, or an organic solvent solution of a terephthaloyl dihalide-isophthaloyl dihalide mixture is added to an aqueous alkaline solution of a bisphenol or mixture of bisphenols. Alternatively, an aqueous alkaline solution of a bisphenol or mixture of bisphenols and an organic solvent solution of a terephthaloyl dihalide-isophthaloyl dihalide mixture can be simultaneously added to a reaction vessel. Interfacial polycondensation takes place near the interface of the aqueous phase and the organic phase. However, since the aqueous phase and the organic phase essentially are not miscible, it is necessary to mutually disperse the phases. For this purpose an agitator or a mixer such as Homo-mixer can be used.

The concentration of the terephthaloyl dihalide-isophthaloyl dihalide mixture dissolved in the organic solvent is usually from about 2 to 25 weight %, more preferably, from 3 to 15 weight %. The concentration of the bisphenol or mixture of bisphenols in the aqueous alkaline solution is also usually from about 2 to 25 weight %, more preferably, from 3 to 15 weight %.

The amount of the bisphenol or mixture of bisphenols and of the terephthaloyl dihalide-isophthaloyl dihalide mixture used (molar ratio) is preferably maintained equivalent. An excess of the terephthaloyl dihalide-isophthaloyl dihalide mixture is not desirable in the preparation of the high molecular weight polyarylate.

Preferred alkalis are sodium hydroxide and potassium hydroxide. The concentration of the alkali in the aqueous solution can vary widely depending upon the reaction conditions, but is usually in the range from about 0.5 to 10 weight %. It is advantageous if the quantity of alkali is nearly equivalent to the hydroxy groups of the bisphenol or bisphenols used or is present in a slight excess. The preferred molar ratio of the alkali to the hydroxy group of the bisphenol or bisphenols is from 1:1 to 2:1, most preferably, from 1:1 to 1.1:1.

As organic solvents which can be used for dissolving the terephthaloyl dihalide-isophthaloyl dihalide mixture, hydrocarbons or halogenated hydrocarbons are used. For example, methylene dichloride, chloroform, tetrachloromethane, 1,2-dichloroethane, 1,1,2-trichloroethane, tetrachloroethane, benzene and methylbenzene can be employed. Especially preferred are those solvents which also dissolve the aromatic copolyesters produced. The most preferred solvent is 1,1,2-trichloroethane.

The reaction temperature is not strictly limited, and depends on the solvent used. For example, in the case of methylene dichloride, the reaction temperature is usually preferably below 40° C., with from 5° to 30° C. being especially preferred.

Interfacial polymerization is usually conducted at normal pressure and is completed in about 1 to 4 hours.

Antioxidants, dispersing agents, catalysts and viscosity stabilizers can be added to the aqueous alkaline solution or to the reaction mixture, if desired. Typical examples of such agents are as follows. As antioxidants, sodium hydrosulfite or sodium bisulfite can be used. As dispersing agents, anionic surface-active agents, such as sodium lauryl sulfate and octadecyl benzene sulfonate, cationic surface-active agents, such as cetyl trimethyl ammonium chloride, and nonionic surface-active agents such as poly(ethylene oxide) adducts can be used. As catalysts, quaternary ammonium compounds, such as trimethyl benzyl ammonium hydroxide, trimethyl benzyl ammonium chloride and triethyl benzyl ammonium chloride, tertiary sulfonium compounds, such as dimethyl-2-hydroxyphenyl sulfonium chloride, quaternary phosphonium compounds, such as triphenyl methyl phosphonium iodide and trimethyl octyl arsonium iodide can be used. Tertiary ammonium compounds, such as trimethyl amine, triethyl amine and benzyl dimethyl amine can also be used as catalysts. As viscosity stabilizers, mono-valent compounds, especially mono-valent phenol compounds, such as p-cumyl phenol, o-phenyl phenol, p-phenyl phenol, m-cresol and β-naphthol can be used, if desired.

Another useful method for forming the polyarylates is melt polymerization, as disclosed, for example, in A. Conix, *Ind. Eng. Chem.*, 51 147 (1959), in Japanese Patent Publication No. 15,247/63 and in U.S. Pat. No. 3,395,119.

Melt polymerization can be conducted, for example, by heating and reacting an aliphatic carboxylic acid diester of a bisphenol or mixture of bisphenols and a terephthalic acid-isophthalic acid mixture at reduced pressure. A preferred diester of a bisphenol is the diacetate. Melt polymerization can also be conducted by heating and reacting a bisphenol or mixture of bisphenols and a mixture of a diaryl ester of terephthalic acid and isophthalic acid. A typical diaryl ester is the diphenyl ester. The reaction temperature employed is in the range of from about 150° to 350° C., more preferably, from 180° to 320° C. The reaction pressure is usually varied in the course of the reaction from atmospheric pressure at the early part of the reaction to reduced pressure, such as below about 0.02 mmHg, at the end of the reaction.

In melt polymerization, the molar ratio of the bisphenol or mixture of bisphenols and the mixture of terephthalic acid-isophthalic acid components to prepare a high molecular weight polyarylate must be maintained exactly equivalent.

A number of catalysts can be used. Catalysts which are preferably used are titanium compounds, such as butyl orthotitanate and titanium dioxide. Other catalysts, such as zinc oxide, lead oxide and antimony dioxide can also be used.

Still another method for forming the polyarylates is solution polymerization, in which the polyarylates are prepared by reacting a bisphenol or mixture of bisphenols with terephthaloyl dihalide and isophthaloyl dihalide in an organic solvent solvent. Solution polymerizations which can be used are disclosed, for example, in A. Conix, *Ind. Eng. Chem.*, 51 147 (1959), and in U.S. Pat. No. 3,133,898.

In solution polymerization, the bisphenol or mixture of bisphenols and the mixture of terephthaloyl dihalide and isophthaloyl dihalide, e.g., terephthaloyl dichloride and isophthaloyl dichloride, are usually mixed in equimolar proportions in an organic solvent, and the mixture is warmed gradually to high temperatures, such as about 220° C. As the organic solvent used, those solvents which also dissolve the polyarylates produced, such as dichloroethyl benzene, are preferred. Usually, the reaction is carried out in the presence of a base to neutralize the hydrogen halide, e.g., hydrogen chloride, formed.

The polyarylate alloy compositions of the present invention are obtained by mixing the above-described polyarylate homopolymers and copolymers with a polymer resin selected from the group consisting of polybisphenol A carbonate and polystyrene. In general, the alloy composition will contain about 10 to 90% by weight of polyarylate and about 90 to 10% by weight of polybisphenol A carbonate or polystyrene. Preferably, the alloy composition will contain about 20 to 80% by weight of polyarylate and about 80 to 20% by weight of polybisphenol A carbonate or polystyrene. The polystyrene will normally have an average molecular weight of about 100,000 to 1,000,000, preferably about 300,000. The polybisphenol A carbonate will normally have an average molecular weight of about 20,000 to 50,000, preferably about 30,000.

To add polybisphenol A carbonate or polystyrene to the polyarylates of this invention, any well known mixing technique can be used. For example, grains or powders of these two components can be mixed and blended with a V-blender, Henschel mixer, Super mixer or Kneader, and then the mixture immediately molded. Alternatively, the mixture can be formed into pellets after melting with an extruder, a co-kneader, an intensive mixer, or the like, and then molded. The pelletizing or molding temperature is generally in the range of from about 250° to 350° C., more preferably, 260° to 320° C.

Another addition method comprises adding the polybisphenol A carbonate or polystyrene to a solution of the polyarylate and then evaporating off the solvent. As the solvent, those which dissolve the polyarylate can be used, such as methylene dichloride, tetrachloroethane and chloroform. The preferred solvent is tetrachloroethane. The solution of polymers in a solvent may be poured into a nonsolvent to precipitate the polymer and the precipitated alloy can be removed by filtration. Suitable nonsolvents are the lower alcohols, such as methanol, ethanol, propanol, butanol, and the like. An especially preferred nonsolvent is ethanol.

The most suitable method for any particular system can be chosen according to the composition and the desired shape and properties of the molded articles to be produced therefrom.

In order to improve the heat resistance, light stability, weatherability or oxidation resistance of the composition or articles produced according to this invention, agents preventing thermal degradation, antioxidants, ultraviolet absorbants, and the like, can be added thereto, if desired. For example, benzotriazole, aminophenyl benzotriazole, benzophenone, trialkyl phosphates, such as trioctyl phosphate and tributyl phosphate, trialkyl phosphites, such as trioctyl phosphite, and triaryl phosphites, such as triphenyl phosphite, can be used. These materials are conveniently added to the polyarylate copolymers and alloys of this invention at any time prior to molding. Known plasticizers, such as phthalate esters, e.g., dioctyl terephthalate, dioctyl orthophthalate and dioctyl isophthalate, and colorants, such as carbon black and titanium dioxide, may also be added if desired, in commonly used amounts as are known in this art.

The polyarylate polymers and alloys of this invention can be used to form many useful articles using generally known molding methods, such as injection molding, extrusion molding, press molding, and the like. Typical examples of final products produced therefrom are films, monofilaments, fibers, injection molded materials, such as machine parts, automobile parts, electrical parts, vessels and springs. The polyarylate polymers and alloys of this invention find special use as engineering plastics for various uses which require good properties.

The following examples are provided to illustrate the invention in accordance with the principles of this invention but are not to be construed as limiting the invention in any way except as indicated by the appended claims. In the examples, the term "polycarbonate" refers to polybisphenol A carbonate.

EXAMPLES

Example 1

Preparation of 9,9-bis(3', 5'-dimethyl-4'-hydroxyphenyl)fluorene

A 500-ml four-necked, round-bottom flask equipped with a mechanical stirrer, air/water condenser with a drying tube, and a thermometer was charged with 47.0 g (0.20 mole) of 9,9-dichlorofluorene, 98.0 g (0.80 mole) of 2,6-dimethylphenol and 150 g of chlorobenzene. The resulting mixture was heated to 120° to 130° C. while maintaining stirring. HCl vapors were released and passed out through the condenser. The course of the reaction was monitored by gas chromatography. Heating and stirring were continued for about 24 hours. The reaction mixture was cooled and filtered to give 67.9 g of crude product. This material was recrystallized from 800 ml of absolute ethanol. After drying, there was obtained 41.7 g of product having a melting point of 279° to 284° C. The product was analyzed for the percent of carbon and hydrogen. Analytical calculated for $C_{29}H_{26}O_2$: C, 85.68; H, 6.45. Found: C, 85.58; H, 6.13. NMR (CDCl$_3$): δ7.4 (m, 4, ArH), 6.7 (s, 2, ArH), 4.4 (s, 1, ArOH), 2.1 (s, 6, CH$_3$).

EXAMPLE 2

Preparation of 9,9-bis(3',5'-dimethyl-4'-hydroxyphenyl)fluorene iso/terephthalate Polymer A 500-ml, three-necked, round-bottom flask equipped with a mechanical stirrer, thermometer and nitrogen gas inlet and outlet was charged with 135 ml of water, 30 ml of 1,1,2-trichloroethane, 0.14 g of triethylbenzylammonium chloride, 0.02 g of sodium bisulfite, 1.76 g (0.044 mole) of sodium hydroxide and 8.12 g (0.02 mole) of 9,9-bis(3',5'-dimethyl-4'-hydroxy-phenyl)fluorene. The reaction mixture was stirred at a motor speed of 1000 rpm under a nitrogen atmosphere at a temperature not exceeding 10° C. maintained by an ice water bath. The stirrer speed was checked by a photo tachometer. Then, 2.03 g (0.01 mole) each of isophthaloyl chloride and terephthaloyl chloride dissolved in 40 ml of 1,1,2-trichloroethane was added over a one-half hour period of time. Then the reaction mixture was allowed to stir at room temperature for four hours. After this time, the reaction mixture was poured into 600 ml of ethanol. The solid polymer was precipitated out and collected by suction filtration. The polymer was washed with ethanol and dried in a vacuum oven at 100° C. for 16 hours. The yield of polymer was 10.7 g, an 87.8% yield. The polymer was dissolved in a mixed solvent of 40/60 phenol and 1,1,2,3-tetrachloroethane by rotating it overnight. The Gardner viscosity of a 10% solution was 3.70 poises at 25° C. Reduced viscosity was measured at 0.25 g/100 ml in 1,1,2,2-tetrachloroethane. Reduced viscosity was 0.71 dl/g at 25° C. The glass transition temperature, measured by differential scanning calorimetry (DSC), was 327° C.

EXAMPLE 3

Preparation of 9,9-Bis(3',5'-dimethyl-4'-hydroxyphenyl) Fluorene, 5-Keto-10,10-bis (4'-hydroxyphenyl) Anthracene Iso/Terephthalate Copolymer A 500-ml, three-necked flask equipped with mechanical stirrer, thermometer, and nitrogen inlet and outlet was charged with 6.09 g (0.015 mole, 50 mole %) of 9,9-bis-(3', 5'-dimethyl-4'-hydroxyphenyl) fluorene, 5.64 g (0.015 mole, 50 mole %) of 5-keto-10,10-bis-(4'-hydroxyphenyl) anthracene, 0.20 g (0.0009 g mole) of triethylbenzyl ammonium chloride, 0.02 g of sodium bisulfite, 2.64 g (0.066 mole) of sodium hydroxide, 135 ml of water, and 30 ml of 1,1,2-trichloroethane. The reaction mixture was stirred at a motor speed of 1000 rpm under a nitrogen atmosphere at a temperature not exceeding 10° C. maintained by an ice water bath. A mixed solution of terephthaloyl dichloride, 3.05 g (0.015 mole), and isophthaloyl dichloride, 3.05 g (0.015 mole), in 40 ml of 1,1,2-trichloroethane was added over a period of 30 minutes. At the same time, the mixture was vigorously stirred. The ice water bath was then removed and replaced with a room temperature water bath. Stirring was continued for an additional four hours. Subsequently, the upper layer was decanted and replaced by 100 ml of distilled water and 30 ml of 1,1,2-trichloroethane. The mixture was again stirred for 30 minutes. The resulting aqueous layer was decanted and removed. The organic layer was poured into 500 ml of 200-proof ethanol. A white polymer was precipitated, which was collected by suction filtration. The polymer was washed four times with 200 ml of ethanol. The product was placed in a vacuum oven at 100° C. overnight. The yield of polymer was 15.2 g. This was a 91% yield. The polymer was dissolved for Gardner viscosity in a mixed solvent of 40/60 phenol and 1,1,2-tetrachloroethane by rotating it overnight. The Gardner viscosity of 10% polymer solution was 2.50 poises at 25° C. Reduced viscosity was measured at 0.25 g/100 ml in 1,1,2-tetrachloroethane. Reduced viscosity was 0.65 dl/g at 25° C. The glass transition temperature, Tg, measured by differential scanning calorimetry (DSC), was 301° C.

Following the above procedure, various copolymers were prepared having different mole ratios of bisphenols. The glass transition temperature, Tg, of copolymers having various mole ratios of bisphenols is shown in Table 1.

TABLE 1

| Polyarylate Iso/Terephthalate (1/1) Copolymer | | |
|---|---|---|
| 5-Keto-10,10-bis (4'-hydroxyphenyl) Anthracene Mole % | 9,9-Bis-(3',5'-dimethyl-4'-hydroxyphenyl) Fluorene | |
| | Mole % | Tg |
| 20 | 80 | 315 |
| 40 | 60 | 297 |
| 50 | 50 | 301 |
| 60 | 40 | 296 |
| 80 | 20 | 298 |

EXAMPLE 4

Preparation of the Alloy of 9,9-Bis (3',5'-dimethyl-4'-hydroxyphenyl) Fluorene Iso/Terephthalate Polymer With Polycarbonate In a 20-ml vial was placed 1.6 g of 9,9-bis(3',5'-dimethyl-4'-hydroxyphenyl) fluorene iso/terephthalate, 0.4 g of polycarbonate (Lexan 141), and 18.0 g of 1,1,2,2-tetrachloroethane. The vial was placed on a rotator and rotated until the mixture was completely dissolved. This was about a 1:1 solution of the polymers by weight. 2 ml of the above polymer solution was placed on a 2.5 in.×5 in. glass plate. A film was cast with a 0.02-in. thickness doctor blade. The cast film was first dried at room temprature in the hood until most of the solvent had evaporated. The glass plate with film was transferred to a forced air oven at 40° C. for four hours and at 75° C. for an additional four hours. The compatibility of the film was examined after it was removed from the oven. The remainder of the polymer solution was poured into 150 ml of ethanol. A white polymer was precipitated which was collected by suction filtration. The polymer was washed four times with 50 ml of ethanol. The product was then placed in a vacuum oven at 100° C. until the weight was constant. The glass transition temperature, Tg, for this alloy, measured by differential scanning calorimetry, is shown in Table 2.

TABLE 2

| Polyarylate, Wt % | Polycarbonate, Wt % | Tg, °C. |
|---|---|---|
| 80 | 20 | 303 |

What is claimed is:

1. A polyarylate copolymer prepared by reacting (A) a mixture of a bis(hydroxyphenyl) fluorene compound of the formula

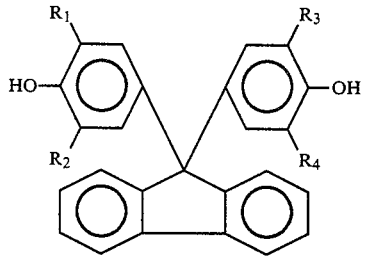

wherein $R_1$, $R_2$, $R_3$ and $R_4$ are independently hydrogen, lower alkyl of 1 to 4 carbon atoms or phenyl; or a polyarylate-forming derivative thereof; and a bisphenol compound of the formula:

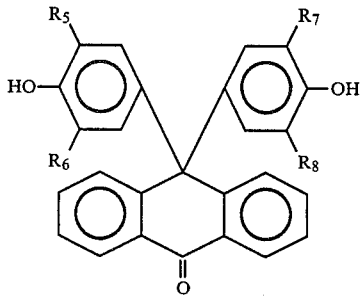

wherein $R_5$, $R_6$, $R_7$ and $R_8$ are independently hydrogen, lower alkyl of 1 to 4 carbon atoms or phenyl; or a polyarylate-forming derivative thereof; and wherein the molar ratio of bis(hydroxyphenyl)fluorene to bisphenol is from 20:1 to 1:20; and (B) a mixture of isophthalic and terephthalic acid or polyarylate-forming derivatives thereof, in a molar ratio of 9:1 to 1:9, respectively.

2. The copolymer according to claim 1, wherein $R_1$, $R_2$, $R_3$ and $R_4$ are independently lower alkyl of 1 to 4 carbon atoms.

3. The copolymer according to claim 2, wherein $R_1$, $R_2$, $R_3$ and $R_4$ are methyl.

4. The copolymer according to claim 1, wherein $R_5$, $R_6$, $R_7$ and $R_8$ are hydrogen.

5. The copolymer according to claim 1, wherein $R_5$, $R_6$, $R_7$ and $R_8$ are independently lower alkyl of 1 to 4 carbon atoms.

6. The copolymer according to claim 5, wherein $R_5$, $R_6$, $R_7$ and $R_8$ are methyl.

7. The copolymer according to claim 1, wherein the molar ratio of isophthalic to terephthalic acid is about 3:1 to 1:3.

8. The copolymer according to claim 7, wherein the molar ratio of isophthalic to terephthalic acid is about 1:1.

9. The copolymer according to claim 1, wherein the molar ratio of bis(hydroxyphenyl)fluorene to bisphenol is about 9:1 to 1:9.

10. The copolymer according to claim 9, wherein the molar ratio of bis(hydroxyphenyl)fluorene to bisphenol is about 4:1 to 1:4.

11. A polyarylate alloy composition comprising (A) 10 to 90% by weight of a polyarylate of the formula

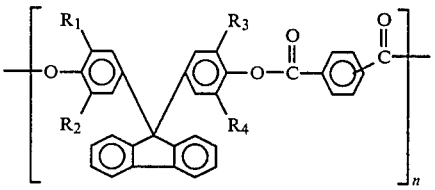

wherein $R_1$, $R_2$, $R_3$ and $R_4$ are independently hydrogen, lower alkyl of 1 to 4 carbon atoms or phenyl; n is the degree of polymerization; and wherein

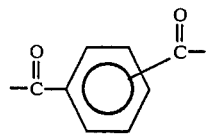

is an isophthalic or terephthalic acid moiety present in a molar ratio of 9:1 to 1:9, respectively; and (B) 10 to 90% by weight of a polymer resin selected from the group consisting of polybisphenol A carbonate and polystyrene.

12. The composition according to claim 11, wherein $R_1$, $R_2$, $R_3$ and $R_4$ are independently lower alkyl of 1 to 4 carbon atoms.

13. The composition according to claim 12, wherein $R_1$, $R_2$, $R_3$ and $R_4$ are methyl.

14. The composition according to claim 11, wherein the molar ratio of the isophthalic to terephthalic acid moiety is about 3:1 to 1:3.

15. The composition according to claim 14, wherein the molar ratio of the isophthalic to terephthalic acid moiety is about 1:1.

16. The composition according to claim 11, wherein component (B) is polybisphenol A carbonate.

17. The composition according to claim 11, wherein component (B) is polystyrene.

18. A polyarylate alloy composition comprising (A) 10 to 90% by weight of a polyarylate copolymer prepared by reacting (1) a mixture of a bis(hydroxyphenyl) fluorene compound of the formula

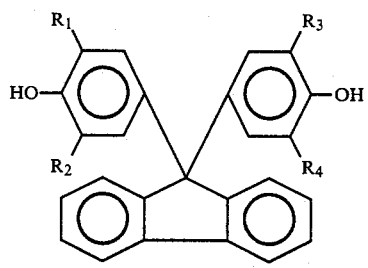

wherein $R_1$, $R_2$, $R_3$ and $R_4$ are independently hydrogen, lower alkyl of 1 to 4 carbon atoms of phenyl; or a polyarylate-forming derivative thereof; and a bisphenol compound of the formula

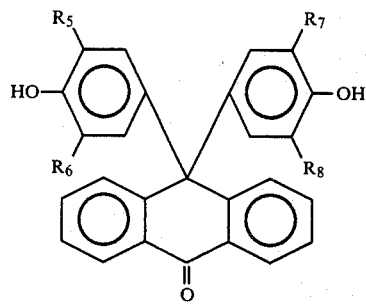

wherein $R_5$, $R_6$, $R_7$ and $R_8$ are independently hydrogen, lower alkyl of 1 to 4 carbon atoms or phenyl; or a polyarylate-forming derivative thereof; and wherein the molar ratio of bis(hydroxyphenyl)fluorene to bisphenol is from 20:1 to 1:20; and (2) a mixture of isophthalic and terephthalic acid or polyarylate-forming derivatives thereof, in a molar ratio of 9:1 to 1:9, respectively; and (B) 10 to 90% by weight of a polymer resin selected from the group consisting of polybisphenol A carbonate and polystyrene.

19. The composition according to claim 18, wherein $R_1$, $R_2$, $R_3$ and $R_4$ are independently lower alkyl of 1 to 4 carbon atoms.

20. The composition according to claim 19, wherein $R_1$, $R_2$, $R_3$ and $R_4$ are methyl.

21. The composition according to claim 18, wherein $R_5$, $R_6$, $R_7$ and $R_8$ are hydrogen.

22. The composition according to claim 18, wherein $R_5$, $R_6$, $R_7$ and $R_8$ are independently lower alkyl of 1 to 4 carbon atoms.

23. The composition according to claim 22, wherein $R_5$, $R_6$, $R_7$ and $R_8$ are methyl.

24. The composition according to claim 18, wherein the molar ratio of isophthalic to terephthalic acid is about 3:1 to 1:3.

25. The composition according to claim 24, wherein the molar ratio of isophthalic to terephthalic acid is about 1:1.

26. The composition according to claim 18, wherein the molar ratio of bis(hydroxyphenyl)fluorene to bisphenol is about 9:1 to 1:9.

27. The composition according to claim 26, wherein the molar ratio of bis(hydroxyphenyl)fluorene to bisphenol is about 4:1 to 1:4.

28. The composition according to claim 18, wherein component (B) is polybisphenol A carbonate.

29. The composition according to claim 18, wherein compontent (B) is polystyrene.

* * * * *